United States Patent [19]

Hubach et al.

[11] 4,385,322
[45] May 24, 1983

[54] PATTERN RECOGNITION APPARATUS AND METHOD

[75] Inventors: Richard A. Hubach, Santa Barbara; Gary L. DeZotell, Chatsworth; Jack Sacks, Thousand Oaks, all of Calif.

[73] Assignee: View Engineering, Inc., Chatsworth, Calif.

[21] Appl. No.: 66,031

[22] Filed: Aug. 13, 1979

Related U.S. Application Data

[62] Division of Ser. No. 939,061, Sep. 1, 1978, Pat. No. 4,200,861.

[51] Int. Cl.³ .............................................. H04M 5/34
[52] U.S. Cl. .................................. 358/221; 358/282; 358/160
[58] Field of Search ............... 358/221, 169, 166, 160, 358/96, 101, 138

[56] References Cited

U.S. PATENT DOCUMENTS

| | | | |
|---|---|---|---|
| 3,126,447 | 3/1964 | Bendell | 358/221 |
| 3,558,809 | 1/1971 | Aoki | 358/221 |
| 3,706,851 | 12/1972 | Froehlich et al. | 358/96 |
| 3,728,481 | 4/1973 | Froehlich et al. | 358/96 |
| 3,737,571 | 6/1973 | Gaebele et al. | 358/221 |
| 3,976,833 | 8/1976 | Lavery | 358/282 |
| 4,141,040 | 2/1979 | Dischert et al. | 358/221 |

Primary Examiner—John C. Martin
Assistant Examiner—Edward L. Coles
Attorney, Agent, or Firm—Singer & Singer

[57] ABSTRACT

Video information obtained in real time is clocked and digitized according to light intensity. Changing light intensities are adaptively determined to vary the threshold level for determining black and white signals. The scene to be used as a reference is first recorded in a fine format and then in a coarse format. In the search mode the coarse stored information is compared in real time with coarse information from the field of view and convolved to generate a correlation number indicating the percentage of match. The location coordinates in the X and Y dimension for the best match is determined at the location of the highest correlation number. A fine search is then made around the coarse location previously determined by convolving in two dimensions previously stored information against information in real time from the scene under investigation to again determine the highest correlation as a measure of the location where the best possible match can be determined.

2 Claims, 11 Drawing Figures

PATTERN RECOGNITION APPARATUS AND METHOD

BACKGROUND OF THE INVENTION

This is a divisional of Ser. No. 939,061 filed on Sept. 1, 1978, now U.S. Pat. No. 4,200,861.

This invention is concerned generally with the field of pattern recognition and more specifically with the apparatus and method for optically inspecting a scene and then searching an unknown scene to determine the best match possible between the unknown scene and the pattern being searched.

The field of pattern recognition has wide applications in industry, both for the manufacturer and the consumer. With the advent of photoelectric devices capable of generating electrical signals in response to optically detected objects, it has become possible to generate automatic devices for counting, detecting and otherwise utilizing such devices in industry.

The present invention is concerned primarily with the digitizing of a processed video signal that has been normalized with respect to the available light illuminating a given scene.

A black electrical signal equivalent to a black optical signal is generated by utilizing a vidicon tube that has a partially opaqued portion at the beginning of the sweep of the beam. As the beam passes the opaque portion the optical signal is obviously black and the electrical signal generated is then clamped as a reference for the complete system to thereby establish the clamped signal as the black electrical signal.

The digitized optical signal identifies the scene being viewed as either a white scene or a black scene and as a result a zero level signal is generated for a black scene and a one level signal is generated for a white scene.

SUMMARY OF THE INVENTION

In the preferred embodiment the light intensity of each scan of the vidicon is compared to the previously described black level to establish a threshold level for the generation of ones or zeroes as a result of the scene being viewed as dark or light. In the normal course of operating such equipment, it has been discovered that the light intensity of the illuminated scene invariably changes as a result of needs of the user and hence the threshold level of the vidicon may vary from scan to scan and from field to field. By measuring the light threshold for each field and establishing a threshold voltage from a suitable sample and hold circuit, it is possible to apply and compare an updated threshold voltage to the output of the vidicon to thereby adapt the output signals to the available light levels in use at any given time.

Pattern recognition devices are invariably used in connection with repetitive operations where automatic machines are controlled and programmed to perform a series of repetitive operations based upon locating and identifying certain criteria stored in memory in real time.

The developing semi-conductor manufacturing techniques have developed needs for pattern recognition devices to assist in the manufacturing and testing of integrated circuit chips.

For example, in the production of integrated circuit chips a wafer of silicon is usually cut from a silicon module that is between two and five inches in diameter. The process of placing a pattern on the wafer requires a mask and a photoresist that is eventually deposited on the silicon, cleaned and diffused into the silicon base. This process may be repeated up to thirteen different times to obtain the proper diffusion and for each operation the mask must be accurately aligned with the silicon wafer.

Electrically testing each of the diffused chips on the silicon wafer is highly desirable at this time in order to establish whether the diffusion process is complete and the individual chip is acceptable for use.

Probing equipment having the ability to place electrical probes on predetermined areas of the chip are used to determine electrical coefficients and continuity of conduction to thereby determine whether the individual chip is acceptable and may be used or whether it is unacceptable and should be destroyed. At the present time in the manufacture of chips the attrition rate is almost 50 percent and it is most important that each chip be individually inspected before additional labor and expense is expended on further manufacturing process for the individual chip. It should be remembered that for a given silicon wafer of approximately five inches in diameter there may be as many as 50 to 200 individual chips that should be tested.

The pattern recognition devices disclosed herein are capable of being used in industry to either align the mask with the chip for subsequent operations or to locate and identify individual chips on a wafer so as to control probing equipment used to test and assess those chips on a wafer prior to further operations.

In the preferred embodiment a vidicon camera is used having a non-interlaced scan pattern and which allows each line to be consecutively scanned in sequence. If desired, however, an interlaced pattern can also be used.

For purposes of definition the field of view of the camera has been established comprising 250 pixels on a scan length and 240 scans which are one pixel apart. The active area can then be shown to have a locus of points that are 192 pixels by 192 pixels. The significance of the active search area will be made more apparent during the description of the loading and search phase operations.

The actual reference area which is capable of being moved throughout the active area is 64 pixels by 64 pixels which defines a total area of 4,096 pixels.

In the normal course of operation the camera views the referenced scene to be recorded and the digitized video in the form of ones or zeroes for each pixel area is recorded and loaded into memory.

The scene being viewed must then be compared or convolved against the reference stored in memory over the complete active area in order to determine the coordinates of the best possible match as indicated by comparisons performed by the convolver.

It would be necessary to compare a reference area of 64 by 64 or a total of 4,096 pixels for each search location. The number of searches would of course be determined by the area being searched which would result in extremely large memory area.

Other prior art solutions have included utilizing a 64 bit convolver and convolving one line of reference at a time until the complete field had been scanned. Unfortunately a 64 bit convolver requires at least 64 fields when used this way and the time necessary to make that many searches is not acceptable to industry.

The prior art also suggested utilizing 64 convolvers to obtain a speed advantage, however, the hardware associated with generating 64 convolvers is unduly expensive and to say the least not practical (each convolver occupies one whole circuit board).

In the present invention there is achieved a substantial increase in speed for the searching operation utilizing only one conventional sized convolver (64 bits) which in the present embodiment is arranged in an 8×8 format which thereby eliminates the need for excessive equipment and substantially reduces hardware costs.

In the preferred embodiment a first search is made utilizing a super pixel which is defined as a pixel having a width and length that is four times that of two normal pixels thereby creating an area of 16 pixels. In other words, one super pixel has within it an area of 16 normal pixels. Utilizing a search area of 64 pixels by 64 pixels or a total of 4,096 pixels now becomes 16 by 16 super pixels or an area of 256 super pixels.

The search area is then comprised of four super pixel areas each consisting of 64 super pixels.

Prior to starting the search it is necessary to load the reference area of 64 by 64 pixels into a memory area and to then load in a second memory area the same reference area defined as 16 super pixels by 16 super pixels.

In the first or coarse search, each of four 8 by 8 super pixel areas are selectively and consecutively compared against the field of view and the results accumulated in appropriate memory locations.

Each of the four 8 by 8 super pixel areas is moved horizontally in two pixel steps over the active area and then down two pixels and horizontally again until the complete active area has been searched and the correlation value in each position is stored in its appropriate memory location. Each of the remaining three super pixel areas is subsequently searched over the same active area in the same manner and the resulting comparison count accumulated thereby resulting in a total of 4,096 memory locations having a value varying from zero to 48.

The coordinates of the two highest values represent the two best locations having the highest correlation count and therefore become the subject for the second or fine search which is used to review and search the local area around the coordinates of the two highest positions determined by the coarse search.

In the fine search the individual coordinates for each location become the starting point for the fine search, only in this case use is made of the relationship identified as (N/2)−1 where N is the dimensionality of the reference being used which in this case is 8 thereby allowing the search to be started three pixels to the left and three pixels above the actual coordinates discovered by the coarse search. The starting point for the fine search for each of the two locations discovered by the coarse search will start three over and three above the initial point. The actual comparison will be the referenced memory of 64 by 64 normal pixels against the real time pixels scanned by the vidicon. In this case only a single field of search for each location must be made since the desired point is located within a 7×7=49 pixel square area centered on one of the two peaks located during the coarse search (3 pixels on each side of each coordinate of each coarsely located peak).

In the fine search a region of 7 by 7 pixels is actually searched having a starting point of three to the left and three above thereby determining a locus of points that is 7 pixels by 7 pixels around the desired point or a total of 49 that must be evaluated and compared.

This fine search is performed for each of the two highest correlation peaks determined as a result of the course search and the best or highest correlation after the fine search is chosen as the final coordinate for the selected coordinates of the patterns detected.

Further objects and advantages of the present invention will be made more apparent as the description progresses, reference now being made to the accompanying drawings wherein:

DESCRIPTION OF PREFERRED EMBODIMENT

Figure 1:
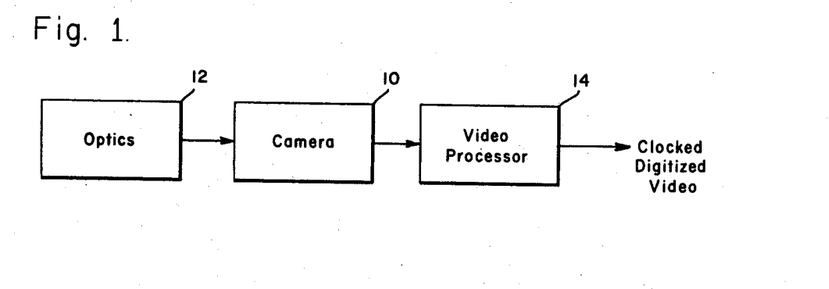
FIG. 1 illustrates a block diagram of the video camera optics and video processor.

Referring now to FIG. 1, there is shown a block diagram of the front portion of the system illustrating how the visual picture seen by the vidicon camera is converted into digital signals representing discrete areas of black and white portions of the viewed scene as a function of ones and zeroes. This process is sometimes called creating a clocked digitized video signal.

A television camera containing a vidicon tube and utilizing optics 12 is focused on a field of view to be analyzed. The blanking and signal circuits associated with camera 10 generate a video signal of a conventional kind. In the preferred embodiment interlaced scanning in camera 10 is not used but, rather, each field of view is scanned sequentially to complete a given frame, for reasons to be described. The video output from the camera 10 is fed to a video processor 14 which generates a clocked digitized video signal output that is adaptively controlled to be optimum for the amount of light on the viewing scene as viewed by optics 12.

Figure 2:
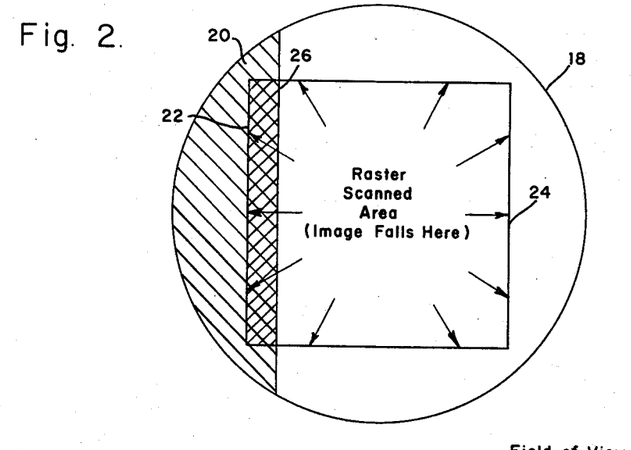
FIG. 2 illustrates the face cover on the vidicon for generating a black reference signal.
Figure 3:
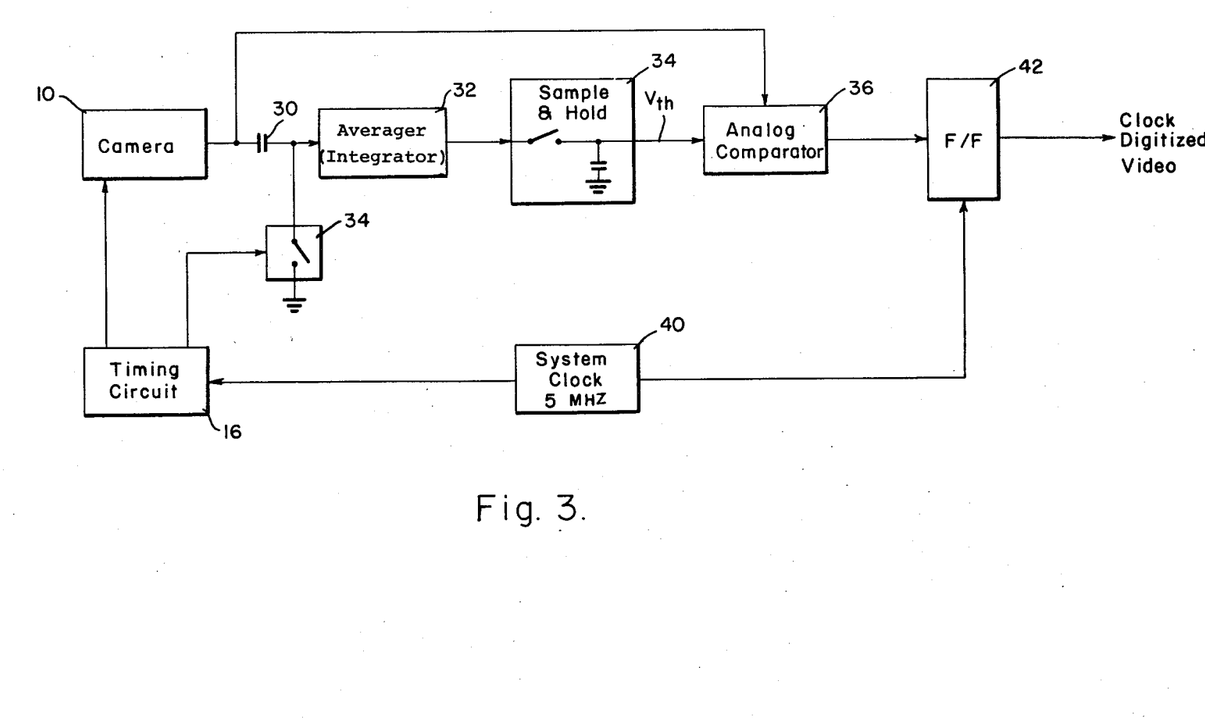
FIG. 3 is a block diagram illustrating details of the video processor.

Referring now to FIG. 3, there is shown a more detailed block diagram of the video processor 14 illustrated in FIG. 1. A timing circuit 16 is connected to the camera 10 for generating the necessary sync and blanking signals that establishes and controls the sweep of the electron beam associated with the vidicon tube. The front end or faceplate of the vidicon is shown as 18 in FIG. 2, with the raster scanned pattern depicted. Located on the leftmost portion of the vidicon faceplate 18 and covering a portion of the raster scanned area is an opaque portion 20. The electron beam associated with the vidicon tube will start sweeping from the left portion 22 and continue to the right side 24 of the raster scanned area at which point the retracted pulse will cause the beam to return to side 22 for the next scan line below the previous scan line.

The camera electron beam starting at line 22 and continuing to the edge of the opaque area 20 to line 26 will optically see a black area and thereby generate an electrical output signal equal to the vidicon dark current.

Figure 4:
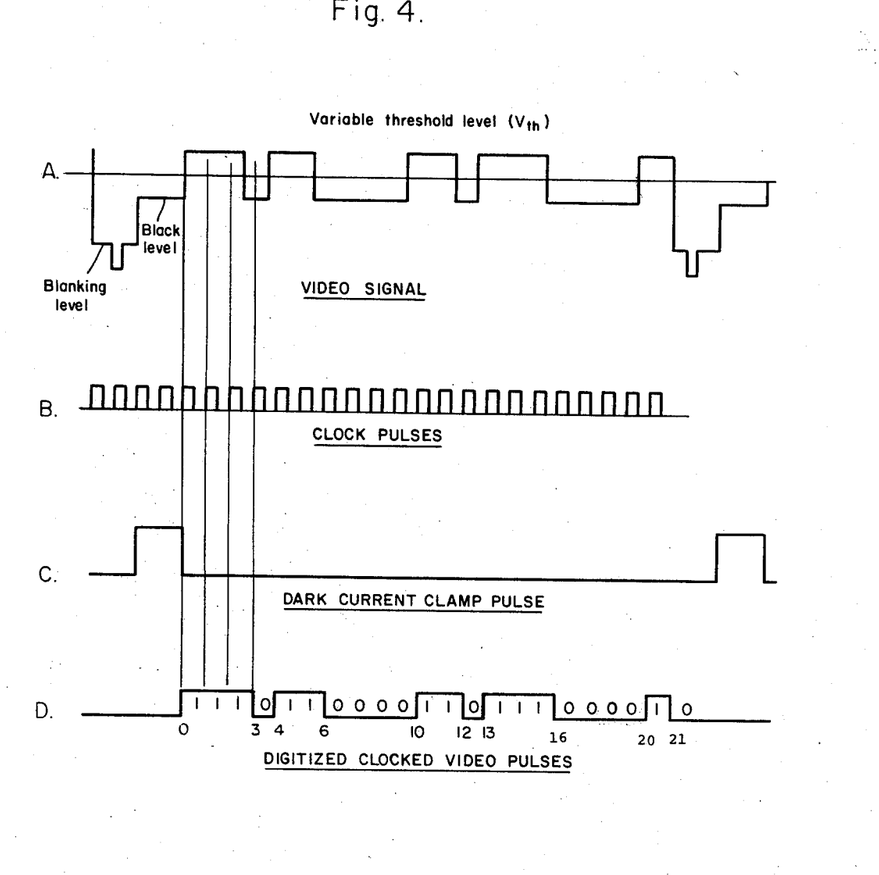
FIG. 4 is a series of three diagrams associated with FIG. 3.

A review of FIG. 4a will show the relationship between the blanking level during retrace and the level of the black level signal corresponding to optical black (and dark current).

As shown in FIG. 3, the video output from camera 10 is fed through a coupling capacitor 30 to an averager 32 sometimes called an integrator. The input to the averager 32 is connected through a switch 34 to ground, which switch is controlled by an output from the timing circuit which generates a pulse less than or equal to the time required for the scanning beam of the vidicon tube 18 as shown in FIG. 2 to scan the area from edge 22 to the end of the opaque (dark current) portion 26. This pulse is shown in FIG. 4(c) and clamps the input of the averager 32 to ground for a period of time during which the vidicon obscuration is being scanned and generating a dark current reference signal. In other words, the dark current signal is clamped to ground as the reference voltage thereby creating a ground reference as equivalent to an optical black signal. The timing pulse is removed when the beam passes point 26 of the vidicon tube 18 and the video signal as shown in FIG. 4(a) is fed to the averager 32 which averages by way of integrating the input signal over the period of time of the complete scan, or of any lesser portion thereof selected by the timing circuits according to the system design parameters.

The output of the averager 32 is fed to a sample and hold circuit 34 that samples the average value of the signal for a complete scan and holds that value for the subsequent scan to thereby determine the average value above which the system will read white (digitized video=1) and below which the system will read black (digitized video=0).

The generation of the variable threshold level is therefore an adaptive function of the average light intensity viewed by the camera 10 over a single scan, which level is then applied to the subsequent scan as the basis for generating digitized video. For a given light intensity illuminating the field of view the variable threshold level should for all practical purposes stay substantially constant. However, in practice, light sources change their illumination; extraneous ambient light is sometimes present, and for given applications additional light is brought to bear on a given scene with the effect of changing the overall level of illumination viewed by the camera optics. The generation of a variable threshold level that is adaptive to the actual illumination viewed by the camera 10 for every scan improves the reliability of the output signal by continually adapting the threshold level to the scene.

An analog comparator 36 compares the video output from the camera 10 to the variable threshold level determined for the previous scan by the sample and hold 34 and in this fashion generates a digitized output signal.

Discretization of the output signal is achieved by means of a system clock 40 that in the preferred embodiment operates at approximately 5 megahertz and generates positive going pulses that are 210 nanoseconds apart as shown in FIG. 4b. The system clock 40 is the basic timer for the system and controls the generation of all timing pulses from timing circuit 16 thereby ensuring that all pulses generated by the system both in the camera subsystems and the signal and data processing subsystems are in sync.

The system clock 40 clocks the digitized video output from the analog comparator 36 by means of a flip flop 42. The rising edge of each clock sets the flip flop 42 to the level of the digitized video signal. The output of the flip flop 42 will therefore be a clocked digitized signal as shown in FIG. 4(b).

A review of FIG. 4 will show that all pulses are timed together by means of the system clock 40.

A review of FIG. 3 will therefore show that at the beginning of each scan line a pulse from the timing circuit 16 controls clamping circuit 34 which clamps the input of the averager 32 to generate a ground reference or black level. The coupling capacitor 30 is therefore allowed to charge to the DC black level generated by the output of camera 10 thereby equating the voltage across the capacitor 30 to the AC optical black level which is effectively clamped to ground as the reference input. The averaging of the signal for a complete scan generates a variable threshold level for the subsequent scan and the analog comparator 36 generates an appropriate output depending on whether the video signal is either above or below the newly determined variable threshold level which is updated for each scan.

The pattern recognizer is based on the method of first generating reliable clocked digital video information that varies in discrete form from one to zero as a result of individual segments that are optically detected as being respectively either light or dark. A system as built and described generates a zero output when scanning a dark segment of scene (voltage below threshold level) and a one output when scanning a bright segment of scene (voltage above the threshold level). In other words, the video camera when looking at a single scan will generate a train of pulses at a specific rate as determined by the clock generator and varying from one to zero as shown in FIG. 4d.

The development of a pattern recognition system has in the past always been plagued by diametrically opposite demands. In order to obtain the necessary resolution the elemental bit area must of necessity be small.

On the other hand, utilizing a small elemental bit area requires that each bit area be convolved by continuously comparing reference information from memory against real time information. The smaller the elemental bit area the longer the time necessary to complete the search. Of course, processing time can be shortened by increasing system complexity and cost and brute forcing a solution which unfortunately is not economically viable in today's competitive marketplace.

On the other hand, making the elemental area larger reduces the number of searches required for convolution, but unfortunately the end result is not sufficiently accurate or precise thereby resulting in a higher false alarm rate and unacceptable performance in the intended applications.

In the present invention a substantially high frequency clock generator of the order of 5 megahertz is used to generate a series of clock pulses in which the spacing between pulse leading edges is 210 nanoseconds. The time interval between successive pulses determines the elemental size of a pixel. A review of FIG. 4d which is the clocked digitized video signal will show that the output video is clocked or discretized into pixels and that each pixel can be identified as having either a zero or a one level depending on whether it corresponds to light or dark signals. The train of pulses illustrated in FIG. 4d can therefore be represented in binary form by the following train of numbers: 1 1 1 0 1 1 0 0 0 0 1 1 0 1 1 1 0 0 0 0 1 0.

The field of view of a TV camera utilizes a raster that is preferably not interlaced. Each line contains 250 pixels and each line is spaced from the other line a distance of one pixel. The total field of view in a preferred embodiment comprises 250 pixels on a line and 240 lines, thereby making a total of approximately 60,000 pixels.

The present invetion has the unique ability to search the defined field of view in substantially real time and convolve the information in storage against real time data to uniquely determine the specific coordinates of the best possible match between the pattern in storage and the corresponding pattern in the real time scene. The above is achieved with a minimum of equipment and in a minimum of time and a degree of accuracy and reliability that has heretofore not been achievable by those skilled in the art.

The benefits claimed for the present invention are achieved by first making a coarse search utilizing a super pixel that is actually 4 by 4 pixels and covers a 16 pixel area. The coarse search is made in two dimensions simultaneously over the complete active area and a continuing correlation measurement is made by an 8 by 8 convolver and stored in memory. The coordinates of the two highest correlation values are determined by a double peak detector and represent the coordinates in super pixel units of the two best matches found as a result of the coarse search.

The final search is a fine search in normal pixel units but limited to the area immediately surrounding each of the two major peak coordinates found as a result of the coarse search. The highest of the two peaks resulting from the fine searches will determine the pixel coordinates of the best match available.

Figure 5:
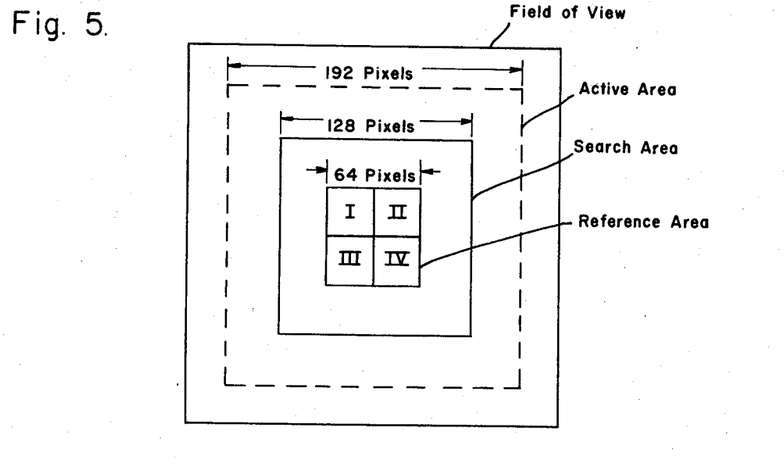
FIG. 5 illustrates the relative size of the search area, the active area, and the field of view.

Referring now to FIG. 5, there is shown a graph illustrating the complete field of view which is approximately 250 pixels by 240 pixels and identified by box 50. The smallest box 52 within the field of view is defined as the reference area and is 64 pixels by 64 pixels in area (4,096 pixels). The reference area represents the information that is placed in storage and which must be compared pixel by pixel with the information in the active area and in real time.

In an early embodiment a 64 bit convolver was used to compare 64 pixels from one line of the search area with 64 pixels from the first line of the reference, storing the correlation values and advancing the search one pixel at a time to the end of the line, and then repeating on subsequent lines. The process was then repeated for each of the 64 lines in the reference with the total correlation value in each position being accumulated with that stored from earlier searches. The coordinates of the highest accumulation indicated the location of the best match. While the system functioned successfully, the time necessary to complete the search was prohibitive and hence the system proved to be of little commercial value.

In the present invention the first or coarse search is made with a reference area of 256 super pixels as illustrated in FIG. 5; each super pixel is equal to 16 regular pixels. The effective resolution of the system is reduced by a factor of four in each dimension.

The reduced resolution causes a corresponding reduction in the accuracy with which the reference pattern may be located in the scene.

The first step in the process requires that the super pixel memory and the regular pixel memory be loaded with the desired reference information that is to be searched for in the field of view. This is called the load phase.

Figure 6:
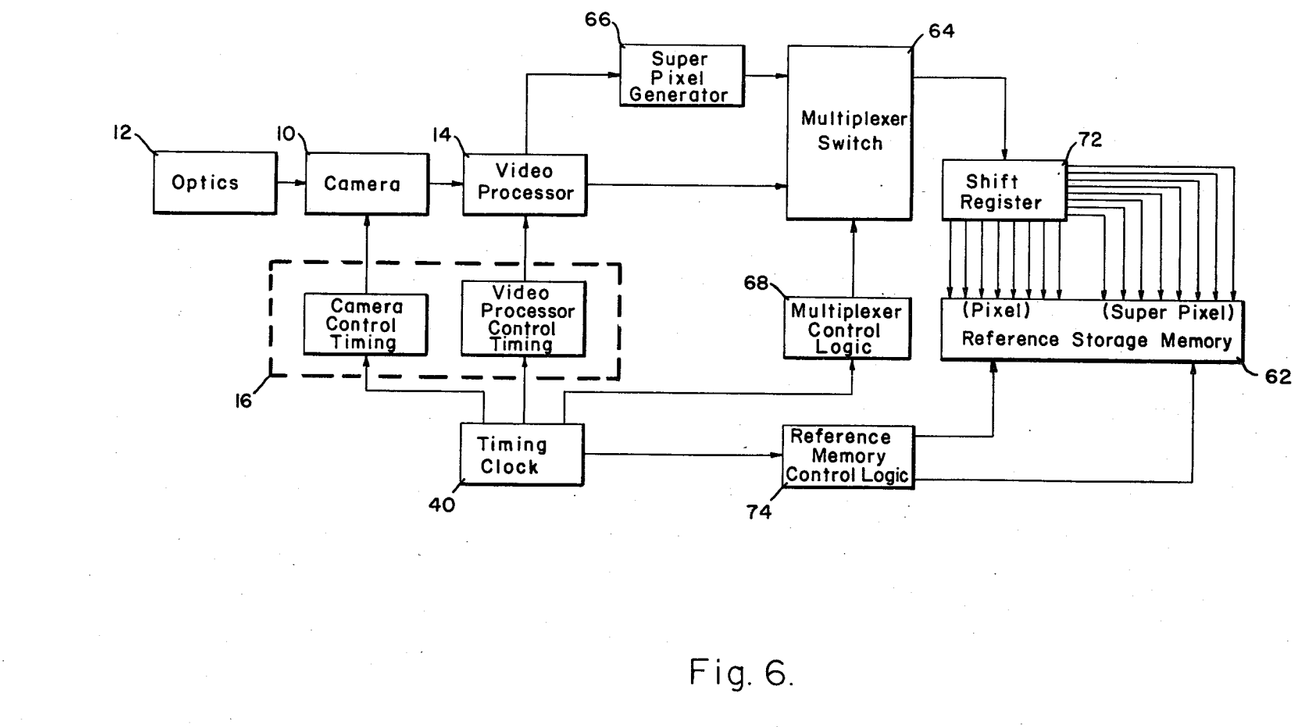
FIG. 6 is a block diagram illustrating the reference memory loading sequence.

Refer now to FIG. 6. The digitized clock pulses from the output of video processor 14 are fed both to a controlled multiplexer 64 and to a super pixel generator 66. A multiplexer control logic 68 controls the timing of opening or closing multiplexer 64 to either allow the output of the super pixel generator 66 to feed a shift register 72 or to allow the clocked video output from the video processor 14 to feed the shift register 72.

During the reference memory loading stage the defined reference area as indicated in FIG. 5 is loaded one pixel at a time into the shift register 72 which is basically in serial in parallel out device for loading the pixel reference storage memory 62. The proper timing of storage memory 62 to either store pixels or super pixels is determined by reference memory control logic 74 tied to the basic timing clock 40.

During the loading of the super pixels in the reference storage memory 62, the multiplexer 64 blocks the output from the video processor 14 to shift register 72 and opens a path from super pixel generator 66 to the shift register 72 while the pixel storage memory 62 is controlled for accepting super pixel information. In this fashion memory information from the reference area in pixel form is recorded and information from the same reference area in super pixel form is subsequently recorded into the reference memory 62 for subsequent use.

For purposes of explanation and description, certain liberties with respect to the lines of the block diagram are taken in order to simplify the control paths and the signal paths.

The super pixel generator 66 is actually a two dimensional digital filter which simultaneously samples four pixels in one direction and four pixels in the orthogonal direction thereby covering a total area of 16 pixels. In order to generate a single output which is either a one or a zero for the super pixel, it is necessary to compare the number of ones with the number of zeroes in the sample area. For example, if the sample area contains 10 ones and 6 zeroes the value of that particular super pixel is determined by majority to be a one. If the majority is zero then the value of the super pixel is zero. In the event that 8 pixels are ones and 8 pixels are zeroes, then that super pixel is arbitrarily set to the value one. It should be noted that this arbitrary bias in favor of the one state will not have any significant effect on final system accuracy since we are concerned here only with the coarse search and not with the fine search. The actual size of the super pixel is a matter of discretion with the designer and is determined solely by system requirements and intended applications. The important concept is the implementation of "electronic defocus" in order to save search time and reduce hardware complexity by instituting a dual search with reduced resolution and accuracy in the first search. The actual technique for generating a super pixel may alternatively comprise a two dimensional analog filter ahead of the video processor.

Figure 7:
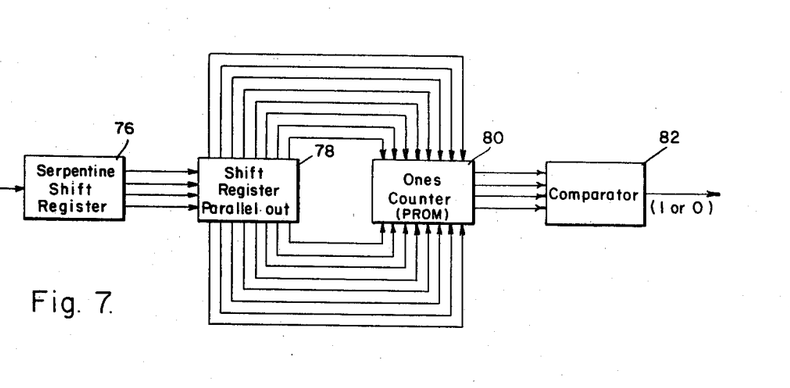
FIG. 7 illustrates the two dimensional digital filter.

Referring now to FIG. 7, there is shown a block diagram of a super pixel generator in the form of a two dimensional digital filter and a comparator.

The output of the video processor 14 is a series of clocked digital video pixels feeding a serpentine shift register 76 which is essentially a serial in serial out shift register device. A more detailed view of a serpentine shift register is shown in connection with FIG. 9. The four outputs from the serpentine shift register 76 consists of four sequential lines of clocked digitized video information, each of the four outputs being vertically in register. The four outputs are expanded in a serial in parallel out shift register 78 producting 16 available outputs, four pixels of each of the four lines. All 16 lines are fed to a ones counter 80 consisting of a programable read only memory chip programmed to output the number of ones in the address being selected. The five line output will thereby represent a number representing the total ones from zero to 16, which is fed to a comparator 82. The comparator compares the total number of ones on the input against a fixed value of 8. If the number of ones inputting the comparator 82 is greater than or equal to 8, a one output is generated, and if the total number of ones inputting the comparator 82 is less than 8, a zero output is generated. The output of the comparator 82 is therefore a one or a zero and represents the combined output of 16 pixels compared and measured at one time by the super pixel generator 66.

A review of FIG. 6 will show that the total capacity of the super pixel reference storage memory 62 is only one-sixteenth the total capacity of the pixel reference storage memory 60, however, since there are fewer total super pixels it is possible to make the coarse search much faster than could otherwise be made pixel by pixel.

Figure 8:
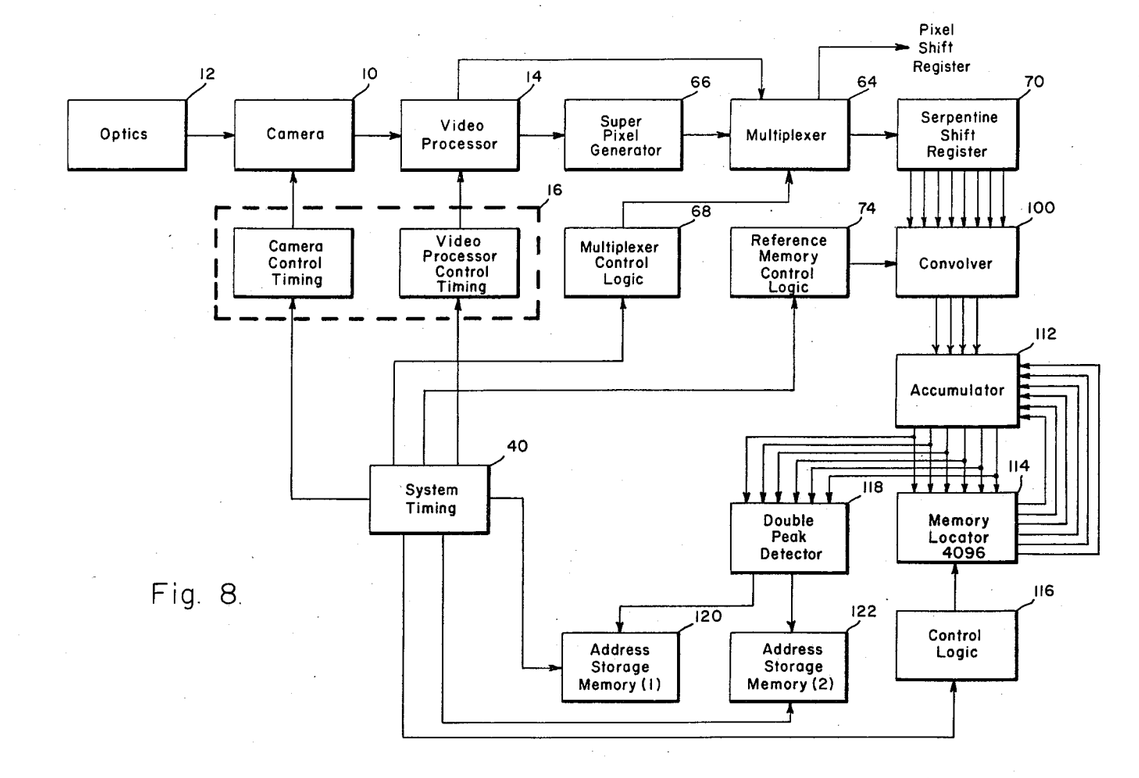
FIG. 8 is a block diagram illustrating the course coordinate locator.

Referring now to FIG. 8, there is shown a block diagram illustrating the basic components used for conducting the phase one or primary search, also called the coarse or low resolution search.

The coarse search is best understood by reviewing FIG. 5 which illustrates the reference area consisting of 256 super pixels contained in memory as was described in connection with the loading operation.

The total super pixel area is divided into four 8 by 8 super pixel reference sub-areas identified by numerals I, II, III and IV, and in which each 8 by 8 super pixel sub-area contains a total of 1,024 normal pixels.

The search operation to be described will commence with the first reference area overlaid in the upper left-hand corner of the active area. The number of matches in this position is accumulated in a first memory location. The first super pixel reference area is then moved two pixel over to the right and again convolved with the scene and the total number of matches accumulated in a second memory location. The process will be repeated every two pixels until the end of the scan. The reference area is convolved every two pixels and every two lines until reference area I has been completely convolved against the total field of view and the sum of each individual comparison accumulated in a separate memory location.

Since the 8 by 8 super pixel reference I area contains 64 super pixels, it is possible at any memory location to have a maximum match of 64, representing a perfect correlation between reference I and some region of the field of view. In the preferred embodiment the convolver maximum output is limited to twelve by a built in threshold which equates an output value of 12 to a maximum match of 64. In the event of a single mismatch the value 11 would be indicative of an actual match of 63 whereas an output value of zero could mean any number of matches less than 52. Below the level of 52 matches, the correlation is not sufficiently reliable to be useful.

The second reference sub-area is then placed in location in the field of view but displaced 8 super pixels from the first to preserve the spatial relationship between the second reference sub-area and the first reference sub-area. The process previously described for the first reference cell is repeated with the second reference cell being compared and subsequently moved two cells to the right, compared and accumulated with the sum previously obtained in the same position with the first reference cell. The second reference sub-area is then convolved over the field of view in a similar fashion with a correlation value being obtained at each position and accumulated with the previous value obtained when using reference sub-area I. At the termination of the second reference sub-area, the total accumulation in each memory location can vary from zero to 24 representing an actual correlation maximum of 128.

The process is repeated with reference sub-area III which starts its search in the field of view 8 super pixels below the starting point of the first reference sub-area and continues every two pixels as before. A comparison is made at each location. The total count in each of the memory cells can range from zero to 36.

The process is repeated with the fourth 8 by 8 super cell which starts its search at a point 8 super pixels below the second reference sub-area and 8 super pixels over from the third reference sub-area. As before, each position is searched every two pixels and accumulated, thereby resulting in a maximum possible total accumulation of 48 in each of the 4,096 memory cells, which count would of course represent a perfect match between the total reference and the area being searched.

A review of FIG. 5 will show that the starting point for the search will be in the search area which is basically 128 pixels by 128 pixels. Since the search progresses at two pixel intervals the total number of searches on the scan will be 64 and the total number of scans will be 64 or a total of 4,096 individual locations. Each of the 4,096 comparisons is located in a separate memory location. The two highest correlation values are continuously reevaluated and updated by the action of a double peak detector and the addresses of the memory locations of the two largest peaks are recorded as a result of the coarse search.

Referring now to FIG. 8, there is shown in more detail the coarse coordinate locator whose function is to determine the coordinate positions of the two highest peaks as a result of making the coarse search.

Similar items and boxes contain similar numbers and are repeated only in the interest of completeness and understanding of the overall system.

In the coarse comparing mode the output of the video processor 14, as mentioned previously, is a clocked digital video signal which is fed to super pixel generator 66. Since the coarse search compares super pixels in memory against super pixels in real time, it is necessary to convert the live scene into super pixels in the super pixel generator 66. The multiplexer switch 64 controlled by the multiplexer logic control 68 directs the output of the super pixel generator 66 into a serpentine shift register 70 which is more fully illustrated in connection with FIG. 9. The output from multiplexer switch 64 is a series of super pixels from super pixel generator 66 that are serially fed into the serpentine shift register 70.

Figure 9:
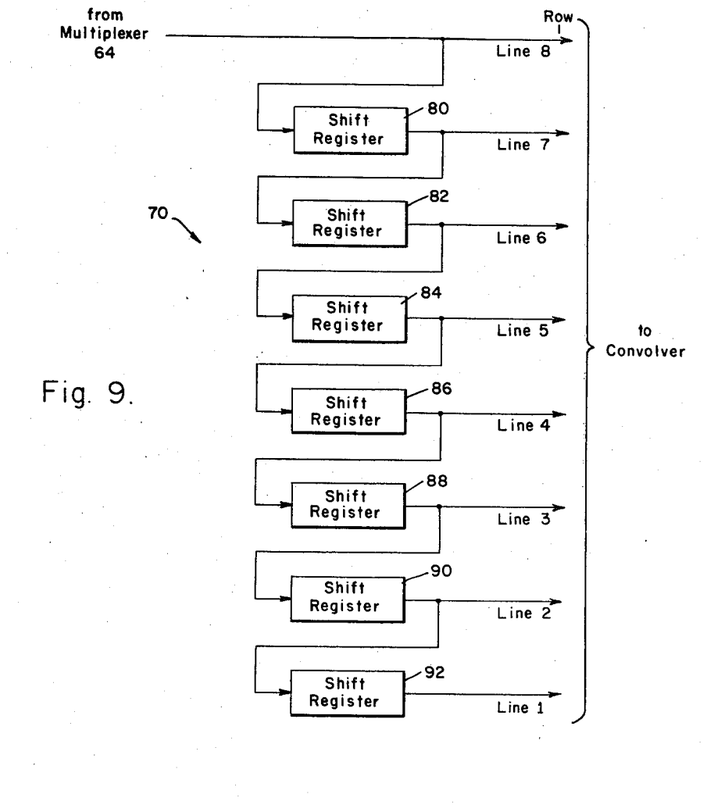
FIG. 9 is a block diagram illustrating a serpentine shift register.

Since the object of the coarse search is to search a two dimensional field, it is first necessary to feed the super pixels serially into a series of 7 shift registers 80, 82, 84, 86, 88, 90 and 92, each of which is one scan line long, thereby ensuring that after 8 scans the information in at least the first row of all 8 columns will be at the output of shift registers 80 through 92, respectively. In this fashion the information in the first row of line 1 will appear at the output of shift register 92, the output of line 2 in the first row will appear at the output of shift register 90 and similarly up the line with the output of line 8 appearing on the direct line from the multiplexer 64.

Referring again to FIG. 8, the output of the 8 lines from the serpentine shift register 70 is fed into convolver 100 where the 8 by 8 super pixel information from reference sub-area I is compared directly with two dimensional 8 by 8 super pixel area information in real time from the field being scanned.

Figure 10:
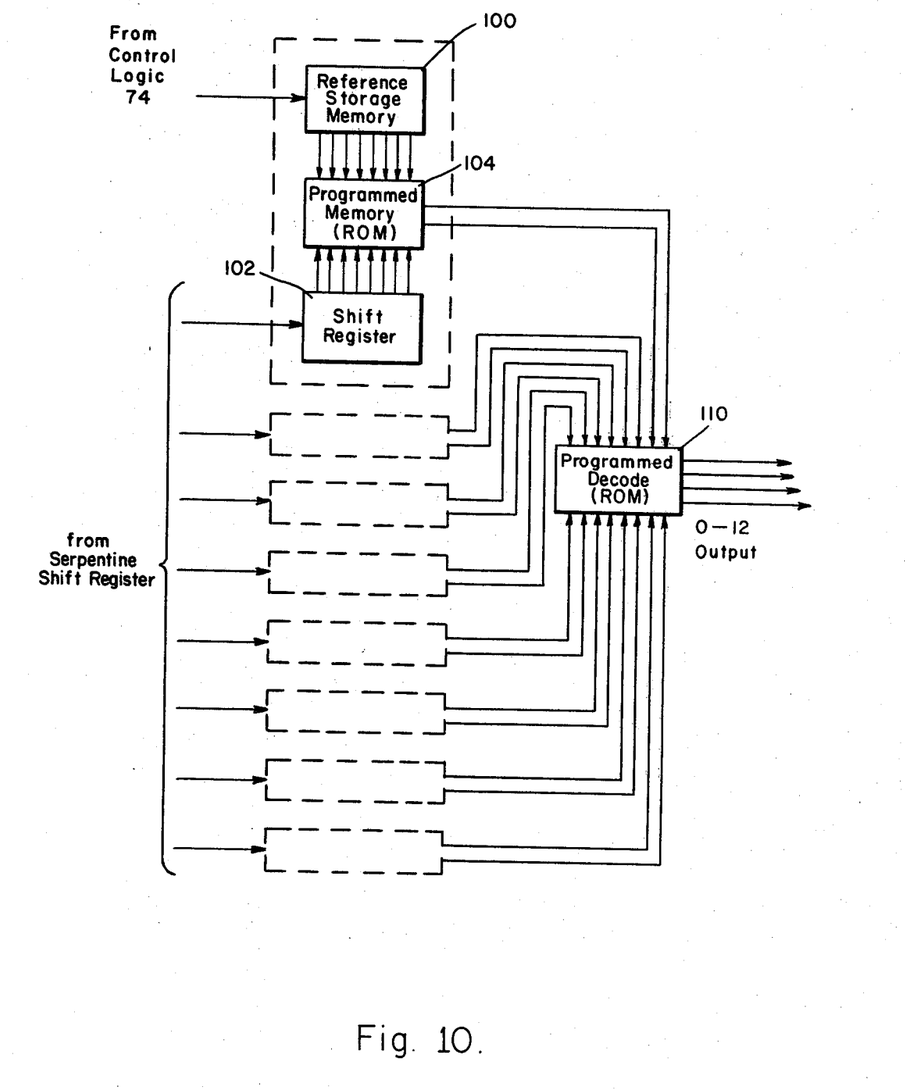
FIG. 10 is a block diagram of a convolver.

FIG. 10 shows in substantial detail the convolver 100. It will be appreciated that the 8 line outputs from the serpentine shift register 70 are each fed to an individual 8 column shift register 102 of which only one is illustrated. Each shift register 102 outputs 8 columns of memory against which 8 columns of live video contained in the reference storage memory 62 can be compared. The outputs actually address a Read Only Memory (ROM) whose purpose is to provide an output indicative of the number of matches between the pattern in shift register 102 and the pattern in reference storage memory 62. The maximum degree of match in each ROM is 8, indicating that 8 columns are perfectly correlated with 8 columns from storage. The total maximum correlation from all 8 ROMS 104 is 64.

In order to reduce complexity and required memory capacity, the output lines are fed to a programmed decode ROM 110 which reduces the output range from 64 (which represents a maximum match) to a maximum range of 12. In other words, an output value of 12 is equivalent to a real match value of 64.

In actual practice useful information is indicated only by a high degree of match, and hence it is only important that the high end comparisons be determined; comparison values below 52 are considered to be unreliable. Therefore ROM 110 is programmed to provide a maximum output reading of 12 in the presence of ones on all of its address input lines from ROMs 104. An output reading of 12 is equivalent to a match value of 64, an output of 11 is equivalent to a match value of 63, and so on, down to an output of zero which is equivalent to a match value of 52 or less.

The output of the ROM 110 for any given two dimensional 8 by 8 search location will thus generate an output ranging from zero to 12.

Refer now to FIG. 8. There is shown how the output from convolver 100 will at any given time appear on four lines representing a value ranging from zero to 12, and which feeds accumulator 112. The accumulator 112 will accept match data for each of the 4,096 searches made by each of the 8 by 8 super pixel reference sub-areas over the field of view, and place each accumulation in a separate location in memory 114. Each memory location in 114 is individually addressable by addresses and control commands from control logic 116.

The output of the accumulator 112 while feeding each individual memory location in memory 114 also feeds a double peak detector 118 that continually monitors the value of the information being placed in each of the memory locations and which retains the two highest correlation values.

The search continues for each 8 by 8 reference sub-area 4,096 times. For each search a maximum value of 12 will be added to and accumulated in each of the 4,096 memory positions. As the accumulator 112 updates each position in memory 114, the double peak detector 118 continually monitors and records the two highest accumulations and maintains the coordinate positions in address storage memory 120 and 122. At the end of reference search II the maximum count that can appear in any of the 4,096 memory locations will be 24 and the two highest accumulations determined will also be recorded in the double peak detector 118 and the address in storage memory 120 and 122.

The process repeats two more times until the 8 by 8 reference area IV completes the 4,096th scan and the total accumulations in each of the 4,096 positions are recorded in memory. The two highest accumulations are also recorded in the double peak detector 118 and the addresses of the two coordinates in the address storage memory 120 and 122, thereby preserving coordinate locations of the two memory cells which have the two highest accumulations indicating the two highest matches.

At this point in time the coarse search is terminated. Two memory cells have been located having the highest matches, and the respective coordinates of each remain in address storage memories 120 and 122.

Having completed the coarse search, the next step in the process is to make a fine search of the reference 64 by 64 normal pixels about each of the coordinate positions determined by the coarse search and located in address storage memory 120 and 122.

The purpose of the fine search is to resolve any possible ambiguity regarding the exact location of the best match.

The fine search utilizes the coordinates stored in the address storage memory 120 and 122. The start of the fine search should not be started at the center of the coarse coordinate locators but rather must be offset to the left and up a number of pixels according to the formula $(N/2)-1$ where N is the respective dimensionality of the reference in pixels.

In the preferred embodiment an 8 by 8 convolver (and thus reference) is employed, and hence the formula indicates that the center of the fine search should initially be started three pixels to the left and three up from each coarse coordinate location in storage memory 120 and 122 (FIG. 8). The offset just mentioned takes into account the possibility that the exact location of the correlation peak may not coincide with either of the coarse addresses exactly.

Figure 11:
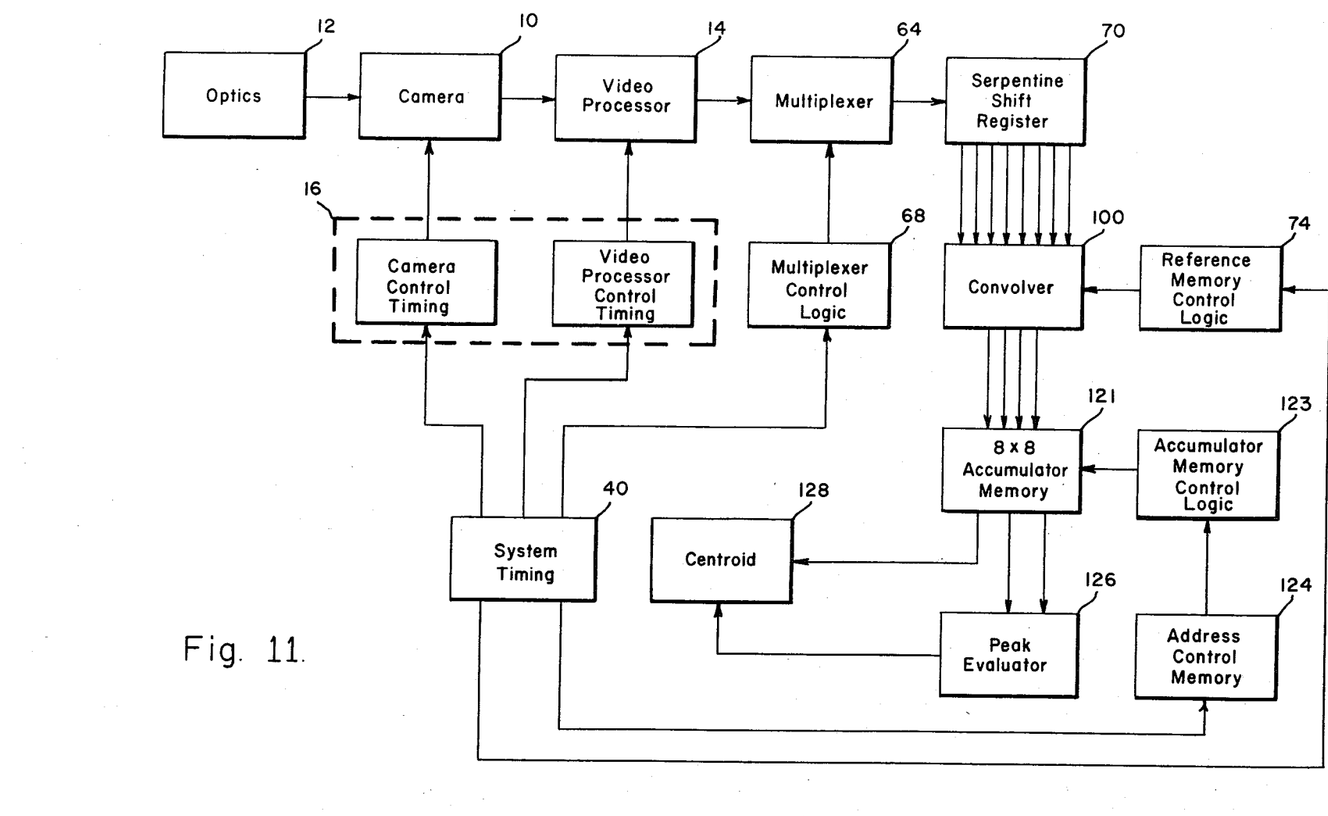
FIG. 11 is a block diagram of the fine coordinate locator for each peak detected.

Referring now to FIG. 11, there is shown a block diagram illustrating the fine search implementation. Digitized video clocked information from the video processor 14 passes through multiplexer 64 to the serpentine shift register 70. As shown in connection with FIG. 9, the serpentine shift register has 8 lines and 7 shift registers that must be loaded in real time as each line is scanned. It therefore takes 8 lines or scans to load the first row into the shift register and then 8 columns of pixels to load the shift registers associated with the convolver 100. At that point in time all 8 columns and all 8 rows of reference data are convolved over the field of view to generate an output which represents the degree of match or correlation between the live data and the reference. The search takes place in two dimensions and as before generates an output varying from zero to twelve which represents a maximum comparison of 64. The output is recorded in the first of 49 memory positions in memory 121.

The shift register associated with the convolver 100 is then stepped over 8 more columns and a second 8 by 8 comparison takes place which again has a maximum value ranging from zero to twelve with twelve actually indicating a maximum comparison of 64. This second increment is added to the first and the total accumulated in the same memory position. The process is repeated every 8 columns until the total array of 64 pixels has been compared 8 times and the sum recorded in accumulation memory 121 which has a total capacity of 49 memory positions.

The accumulator memory 121 is under control of a control logic 123 which in turn is addressed by address control memory 124 which selects the center coordinates about which the fine search is being made. Normally a single field of search will generate 64 convolutions that accumulate in a given memory position in accumulation memory 121.

The number accumulated in memory 121 represents the best match count for 64 by 64 pixel reference.

The total number of searches is determined by a locus of pixels seven pixels wide and seven pixels long centered on the original coarse coordinates.

A review of the geometry of the search shows that the convolver 100 is idle whenever the serpentine shift register 70 is loading 7 lines; the convolver is also idle while shift register 102 shifts 7 columns and before an 8 by 8 convolution in two dimensions can take place. This waiting time can be used to continuously convolve incoming data with stored reference data in memory once the serpentine register and shift register are loaded. In other words, a convolution and 64 accumulations can be made for each of the 49 pixel positions resulting in a unique location of 64 separate accumulations that are repeated for each of the 49 pixels located about the coordinates of the pixel determined by the coarse search.

The address control memory 123 controls the accumulator memory control logic 123 to locate the coordinates of each of the 49 memory positions being accumulated. The addresses of each of the 49 memory positions being accumulated is known a prior; thus the convolver 100 generates an output without any waiting time.

As mentioned previously, each accumulation has a maximum value of 12 for each comparison and since for each pixel position there are 64 accumulations, a maximum possible count of 768 can be accumulated in each of the 49 positions.

The resulting accumulation can be accomplished in a single scan.

The process is carried out for each of the two candidate locations in the address storage memory 122.

The output of the accumulator memory 121 is fed to a peak count evaluator 126 to determine if the peak value detected is actually a peak or whether the selected coordinate location should be discarded. In the preferred embodiment the peak evaluator measures the relative sharpness of a peak. This is determined very simply by successively subtracting from the maximum peak value each of the 48 surrounding values, in order to determine whether the peak selected is in fact a peak at all. Empirical test data has indicated that differencing the selected peak from the values in its immediate vicinity and then adding the differences produces a number representing the reliability of the peak selected. A sum less than 200 is used as a lower limit of reliability indication. It must be remembered that the image detector described herein does not look for a perfect match but rather looks for the best match, and hence it is necessary to evaluate the quality of the best match in order to determine if the best match is reliable.

The peak evaluator 126 performs a successive differencing and sums these differences as a measure of the evaluation of the peak selected. This process repeats for both sets of coordinates selected by the coarse coordinate locator, and finally selects the peak having the highest reliability number as the best estimate of reference location in the field of view.

In the final analysis the peak evaluator 126 computes a centroid of the data in the immediate area of the peak selected by the peak evaluator 126. The centroid is equivalent to an interpolation to find the center of the curve of best fit to the peak whether or not it physically exists on a pixel, or is situated between adjacent pixels.

The image comparator just described requires a total of four fields of search to establish the two coarse positions and one field of search to establish time for the processor to process the information by way of locating coordinates. The fine search requires two complete fields of search, one for each of the two coarse positions located and one additional field to process the information, thereby making a total of 8 fields of search required to obtain the ultimate coordinates of the best possible match. In real time the 8 fields of search require no more than 150 milliseconds.

We claim:

1. A pattern recognition system comprising:
   video camera means for generating a video signal representative of an area being viewed,
   opaque means located on a portion of said video camera means for producing on each line scan a black level video output signal corresponding to a black optical scene produced by said opaque means,
   means for averaging the output signal of said video camera relative to said black video signal for each line scan to generate a varying output threshold voltage,
   means for continuously comparing the output of said video camera means with said threshold voltage to vary the output level on each line scan relative to changes in light intensity,
   clock means for digitizing the compared video output signal thereby generating a clock digitized video output signal having a leading edge and adaptive to varying light intensities, and
   an analog comparator and in which the output of said analog comparator and said clock means are fed to a flip flop circuit for generating a change in state output in the presence of a change in the video signal as measured by the leading edge of each clock pulse.

2. A pattern recognition system comprising:
   video camera means for generating a video signal representative of an area being viewed,
   opaque means located on a portion of said video camera means for producing on each line scan a black level video output signal corresponding to a black optical scene produced by said opaque means, means for averaging the output signal of said video camera relative to said black video signal for each line scan to generate a varying output threshold voltage, means for continuously comparing the output of said video camera means with said threshold voltage to vary the output level on each line scan relative to changes in light intensity, clock means for digitizing the compared video output signal thereby generating a clock digitized video output signal having a leading edge and adaptive to varying light intensitives, and in which the output signal is averaged for each line scan and that value is stored in a sample and hold circuit and applied as the threshold voltage for the next scan thereby providing an adaptive updating of the average light level for each scan.

* * * * *